United States Patent [19]

Cooper

[11] 4,287,023
[45] Sep. 1, 1981

[54] WASTE HEAT RECOVERY

[75] Inventor: William T. Cooper, Bartlesville, Okla.

[73] Assignee: Phillips Petroleum Co., Bartlesville, Okla.

[21] Appl. No.: 69,153

[22] Filed: Aug. 23, 1979

[51] Int. Cl.³ .............................................. C10B 3/02
[52] U.S. Cl. ...................................... 201/31; 201/39; 202/228; 23/313 R
[58] Field of Search .............. 201/31, 5, 39; 202/227, 202/228; 23/313 R, 313 FB

[56] References Cited

U.S. PATENT DOCUMENTS

| 3,140,241 | 7/1964 | Work et al. | 201/31 |
| 3,884,649 | 5/1975 | Matthews | 201/31 |
| 3,989,473 | 11/1976 | Henderson | 23/314 |
| 4,085,707 | 4/1978 | Moss | 201/31 |

FOREIGN PATENT DOCUMENTS 695492 8/1953 United Kingdom .

Primary Examiner—Norman Yudkoff

[57] ABSTRACT

A fixed fluidized particulate solids bed heat recovery vessel or steam generator having indirect heat exchange means within a bed of fluidized carbonaceous solids, such as coke, pelleted carbon black and the like, and introduction of a gas containing entrained solids to effect fluidization of the bed of carbonaceous solids wherein in a preferred embodiment, the reaction effluent from a carbon black reaction zone comprising carbon black suspended in a non-oxidizing gas is preferably quenched, e.g., using water and/or cooled recycled reaction effluent and is then further cooled using a fluidized fixed bed of carbonaceous solids having a cooling coil within the fluidized bed.

9 Claims, 1 Drawing Figure

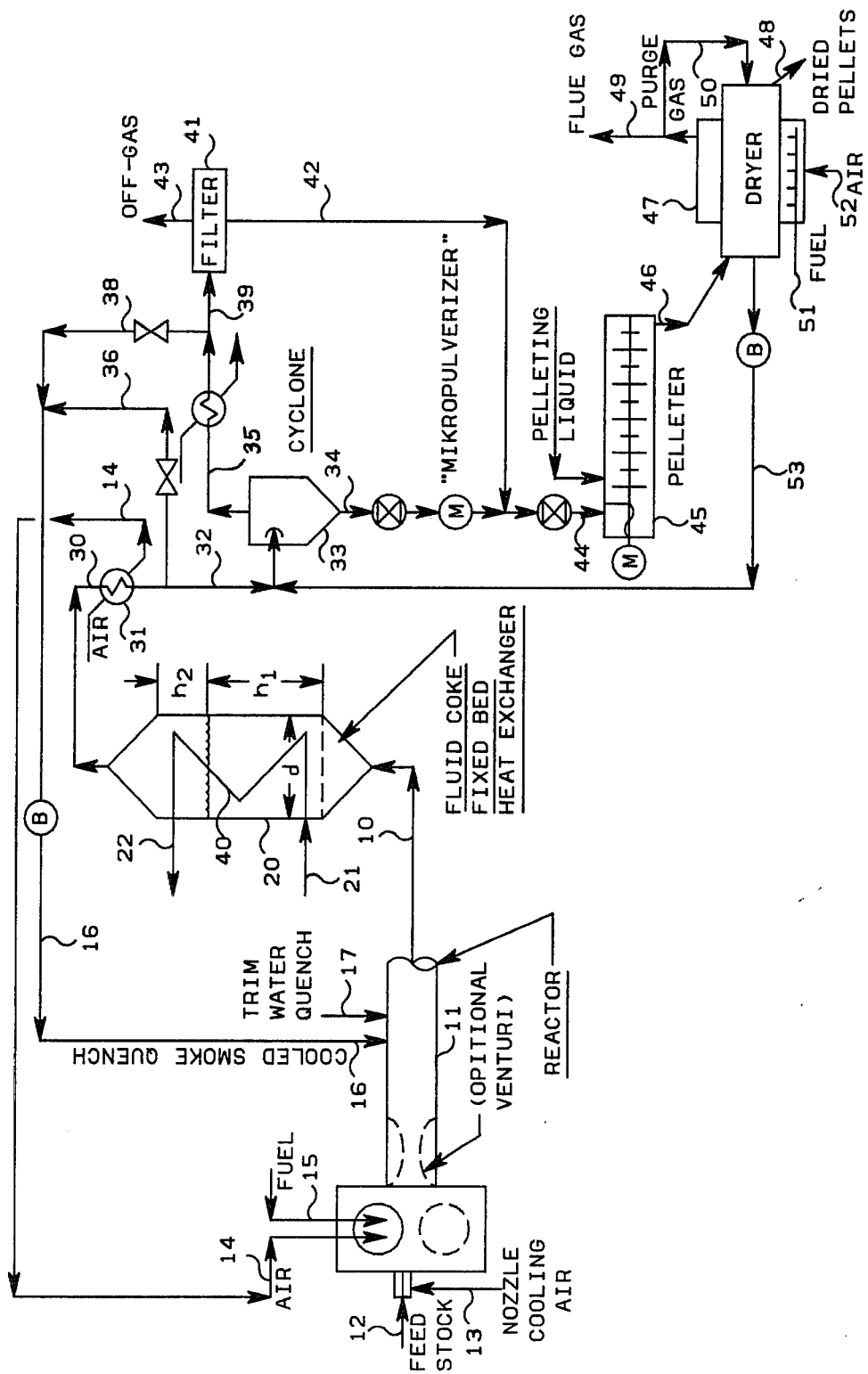

WASTE HEAT RECOVERY

This invention relates to a process for the transfer of heat from and to gases containing entrained solids. In accordance with another aspect, this invention relates to an improved heat recovery process comprising a waste heat recovery unit containing a fluidized bed of particulate carbonaceous solids wherein a gas containing suspended or entrained solids, such as carbon black, is introduced into the fluidized bed to effect heat exchange and fluidization of the bed of carbonaceous solids.

Various expedients have been used to recover heat from gas streams including gas streams containing suspended or entrained solids. It has been proposed by others to recover heat from gaseous streams using a heat exchange zone containing a fluidized fixed bed of solids and a coil extending into the bed. Various solids, including sand, alumina, silica-alumina, and the like have been suggested as the fluidized fixed bed solid. The present invention relates to the use of particulate carbonaceous solids having desirable heat transfer characteristics. In addition, the particulate fluidized solids used in the invention do not add contaminating non-carbonaceous grit to a gaseous stream containing carbonaceous solids, such as carbon black.

Accordingly, an object of this invention is to provide an improved waste heat recovery system.

A further object is to provide a method for carrying out heat exchange in a fluidized bed operation with gases containing suspended solids.

Other objects and aspects as well as the several advantages of the invention will be apparent to those skilled in the art upon reading the specification, the drawing and the appended claims.

Broadly, according to the invention, carbonaceous solids such as coke, carbon black particles, ground coal, graphite, wood char, coal char and the like are used as a fluidized fixed bed of particulate solids in an indirect heat exchange zone containing a coil extending into the fluidized bed which indirect heat exchange zone can be used to cool and/or heat a gaseous stream containing suspended solids.

In accordance with a preferred embodiment of the invention, coke, for example, petroleum coke, preferably calcined coke, is used as a fluidized fixed bed of particulate solids and as the heat transfers solids to effect cooling of a gas containing entrained solids in an indirect heat exchange zone containing a coil extending into the fluidized bed of coke.

In accordance with another embodiment, carbon black reaction effluent comprising carbon black suspended in a non-oxidizing gas is cooled using a fluidized fixed bed of carbonaceous solids having a coil within the fluidized bed. The cooled effluent can then be passed to the gas solid separation zone for recovery of carbon black from the cooled effluent and the resulting gas now lean in carbon black can be filtered. Carbon black recovered from the gas solids separation can be wet pelleted and dried.

In still another embodiment, the carbon black reaction effluent comprising carbon black smoke is quenched with water and/or cooled recycled reaction effluent prior to further cooling in a fluidized fixed bed of carbonaceous solids as set forth above.

In a further embodiment of the invention, instead of cooling a material entrained in a gas, the instant system can be used to heat a material entrained in a gas with a heating fluid passing through the coil located within the fluidized bed of carbonaceous solids. However, in the presently preferred embodiment, the fluidized fixed bed of solids is used to cool the hot reaction effluent from a carbon black reactor.

A better understanding of the invention will be obtained upon reference to the drawing which illustrates one preferred embodiment of the invention for the recovery of heat from the reaction effluent of a carbon black reaction zone.

Referring now to the drawing, a hydrocarbon-containing feedstock, such as a suitable oil, is introduced into a carbon black reactor generally designated 11 by way of line 12 along with cooling air introduced by line 13. Air in line 14 and a fuel in line 15 are introduced into a precombustion chamber in carbon black reactor 11 to produce combustion gases which, in turn, supply heat to convert the feedstock introduced by line 12 into carbon black in carbon black reactor 11. The carbon black reaction takes place at an elevated temperature in the range of about 2500° F. to 2800° F. and the hydrocarbon charge stock is converted to carbon black and the reaction effluent in line 10 exiting from reactor 11 is combustion gases containing entrained carbon black.

Prior to exiting from the carbon black reactor 11, the reaction effluent is cooled by cooled reactor effluent in line 16 and water introduced by line 17. The reactor effluent in line 10 is at about 2000° F.

The carbon black reaction effluent (smoke) in line 10 is introduced into a lower portion of fluidized bed indirect heat exchanger 20. Within indirect heat exchanger 20 is positioned a coil 40 having an inlet for heat exchange fluid at 21 and exit for heat exchanged fluid at line 22.

In accordance with the invention, a bed of carbonaceous solids such as coke is provided within heat exchanger 20. The fluidized bed of particulate carbonaceous solids is provided within the enlarged section of heat exchanger 20. The depth of the fluidized bed covers substantially the entire length of the enlarged section of heat exchanger 20. As indicated above, positioned within the bed of particulate carbonaceous solids is a heat exchange coil 40 through which water or other heat exchange fluid can be passed and converted to steam or other vapor.

The upper section of heat exchanger 20 is tapered which causes the gases leaving the fluidized bed to accelerate and at the same time keep the solids, such as carbon black, entrained in the gas leaving heat exchanger at line 30. The hot gas reduced in temperature to, say, about 1200° F. is removed from heat exchanger 20 by line 30 and passed through heat exchanger 31, line 32 and introduced into gas solids separator 33 wherein the solids are separated therefrom and removed by way of line 34 and the gas lean in carbon black is removed overhead by way of line 35.

As indicated above, a portion of the cooled smoke removed from heat exchanger 20 can be recycled as part of the quench in line 16 for cooling the carbon black reaction effluent. A portion of the gas in line 30 is passed by way of line 36 and thence introduced into line 16 for return to carbon black reactor 11. Additionally, a portion of the gas in line 35 lean in carbon black can be further cooled in heat exchanger 37 and a portion thereof passed by way of line 38 and combined with smoke in line 36 for recycle as quench to carbon black reactor 11. The remainder of the gas lean in carbon black is reduced to a temperature of about 400° F. in line 39, is passed to a relatively small filter 41 wherein the remainder of the suspended carbon black is removed and passed by way of line 42 for pelleting. The filter off-gas is removed by way of line 43.

The recovered carbon black in lines 34 and 42 are passed by way of line 44 to pelleter 45 wherein the carbon black can be contacted with a liquid to form pellets which are removed by line 46 and passed to dryer 47 and recovered as product by way of line 48. A portion of the flue gas in line 49 can be used as purge gas in line 50 and returned to dryer 47 to aid in drying of the wet pellets. Fuel and air are introduced into dryer by way of lines 51 and 52, respectively. Purge gas, removed from dryer 47 by way of line 53, is passed to gas solids separator 33.

Referring once again to heat exchanger 20, the actual gas passage space in the enlarged zone occupied by the fluidized fixed bed of particulate carbonaceous solids, e.g., coke is substantially the same cross-sectional area as that of the outlet or inlet conduits which prevents the suspended solids from accumulating in the fluidized bed and allows the suspended solids to flow in an entrained manner in these gases.

The velocity of the mass required to maintain entrainment depends upon many factors including the density and sizes of the particles entrained in the gas. Typically, for carbon black to be entrained in the carbon black reactor effluent smoke, the minimum range of linear velocity is about 50 to about 100 ft./sec. Operating range preferred for carbon black (carbon black particles or clusters in the range of about 2 to about 30 micron size) is about 150 to about 400 ft./sec. linear velocity.

The carbonaceous solids used as the fluidized fixed bed of solids according to the invention generally will have particle size range, in inches, ranging from about 0.02 to about 0.06. The carbonaceous solids will have a specific heat (at 1200° F.) in the range of about 0.25 to about 0.5 and a density in the range of about 2 to about 2.5.

The carbonaceous solids used as the fluidizing particulate material, accordiing to the invention, are well known and can be derived by well known procedures. For example, coke is well known and is ordinarily derived from petroleum and is preferably calcined prior to use by heating at a temperature in the range of about 900° F. to about 2200° F. Other sources of carbonaceous solids that can be used, according to the invention include pelleted carbon black including partially agglomerated carbon black, pulverized or ground coal, graphite, wood char, coal char, and the like. Although the invention has been illustrated above using a fixed fluidized bed of carbonaceous solids such as coke for cooling carbon black entrained in gas, it should be realized that the invention can be used for heat exchange with solids other than carbon black entrained in a gas. For example, various pigments entrained in a gas can be used. Also, instead of water being in the heat exchange coil, Dowtherm, or a hydrocarbon to be converted, for example, cracked thermally, or preheated, can be used in the heat exchange coil.

The following calculated example sets forth conditions and particular dimensions for an operation such as set forth in the drawing utilizing coke as the fluidized carbonaceous solids.

| Calculated Typical Operation (See FIG.) | |
|---|---|
| Coke (a) | |
| Particle Size Range inches | 0.03 to 0.04 |
| Specific Heat, 1200° F. | 0.4–0.45 |
| Density | 2.2 |
| (a) Preferably calcined coke. (Note: SiO$_2$, | |
| Specific Heat, 1200° F. | 0.28 |
| Density | 2.25) |
| Zone 20: | |
| Nonexpanded Bed Height, ft., | 3.0 |
| Fluid Bed Height, ft., expanded, h$_1$, | 4.5 |
| Disengagement height, ft., h$_2$, | 3 |
| Fluid Bed Diameter, ft., d, | 11 |
| Pounds of Coke in Bed | 27,000 |
| Carbon Black Smoke 10: | |
| SCF/hr. | 470,000 |
| Lbs. Carbon/1000 SCF | 6.5 |
| Temperature, °F. | 2,000 |
| Pressure, psig | 4.5 |
| Actual Velocity, ft./sec. in inlet 10 | 270 |
| Cooled Reactor Effluent 30: | |
| SCF/hr. | 470,000 |
| Lbs. Carbon Black/1000 SCF | 6.5 |
| Temperature, °F. | 1200 |
| Pressure, psig | 1.5 |
| Actual Velocity, ft./sec., in (30) | 175 |
| Average Bed Temperature in 20, °F. | 1,250 |
| Steam Produced in (40): | |
| Pounds/hr. | 12,600 |
| Temperature, °F. | 489 |
| Pressure, psig | 600 |

Note: SCF is Standard Cubic Feet at 60° F., 1 atmosphere

The main feature of the invention is the use of a fluidized fixed bed of carbonaceous solids such as coke, e.g., petroleum coke, preferably a calcined coke, as the heat transfer solids to effect cooling of a carbon black reactor effluent smoke, which smoke has been prequenched, preferably with cooled recycled reactor effluent smoke to about 2000° F. The fluidized fixed bed of carbonaceous solids has a cooling coil therein, e.g., to generate high pressure, high temperature steam, for example. Heat is transferred from the 2000° F. reactor effluent smoke (hot combustion gases containing particulate carbon black solids) via the fluidized fixed bed of carbonaceous solids to the cooling coil. The smoke exiting the "cooling zone" is at about 1200° F., and is further indirectly cooled, e.g., by preheating process air for the carbon black reaction, by feedstock preheating, etc. The cooled effluent is preferably passed to a cyclone separation means to remove about 40 to 60 percent of the carbon black from the smoke, which is now at about 600° F., and the lean smoke is further cooled to, e.g., 400° F., and passed to conventional bag filtration. Carbon black (loose or flocculent) is passed to wet pelleting and drying.

The carbon black recovered from the cyclone is preferably passed via a Mikropulverizer to "grind" any grit to less than about 325 mesh (U.S. Standard Sieve) prior to pelleting.

The purge gas from the dryer is preferably returned to the cyclone.

Sand, alumina, silica-alumina, and the like, have been suggested by others as the fluidized fixed bed solids for cooling carbon black reactor smoke. Use of carbonaceous solids, such as coke, instead of the prior art solids is an improvement in specific heat over the prior art used solids, meaning that less coke, for example, can be used to effect the same heat removal that the prior system can, all other conditions being similar. The carbonaceous fluidized solids of the invention, e.g., coke, add no non-carbonaceous grit to the carbon black product. The prior art solids can add noncarbonaceous grit to the carbon black product.

I claim:

1. A process for conducting indirect heat exchange between a gas stream containing suspended light solids and a heat exchange fluid in an indirect heat exchange zone containing fluidized fixed bed solids which comprises:

(a) introducing a gas stream containing entrained solids into an inlet connected to a lower portion of an enlarged heat exchange zone containing a fluidized fixed bed of particulate carbonaceous solids and a heat exchange coil extending into said fluidized bed and having a heat exchange fluid flowing through said coil, said heat exchange zone being so sized that the actual gas passage space in said enlarged zone occupied by said fluidized fixed bed is substantially the same cross-sectional area as that of the gas inlet and gas outlet which prevents the suspended solids from accumulating in the fluidized bed and allows the suspended solids to flow in an entrained manner in the gas stream, (b) flowing said gas stream through said fluidized bed of particulate carbonaceous solids at a flow rate sufficient to maintain fluidized conditions and at a rate such that said gas is heated or cooled by the heat exchange fluid in said coil, (c) removing said gas stream containing suspended solids at a different temperature from an upper portion of said heat exchange zone, (d) passing said gas stream containing suspended solids to a gas-solids separation zone to separate suspended solids therefrom and recover cooled gas substantially reduced in suspended solids content, and (e) quenching said gas stream containing entrained solids prior to step (a) with water and at least a portion of said cooled gas recovered in (d).

2. A process according to claim 1 wherein said gas stream is at a higher temperature than said heat exchange fluid.

3. A process according to claim 1 wherein said gas stream contains suspended carbon black and the inlet temperature of said gas stream is about 2000° F. and the outlet temperature is about 1200° F.

4. A process according to claim 1 wherein said fluidized particulate carbonaceous solid is coke, said gas stream is at a substantially higher temperature than said heat exchange fluid, and said heat exchange fluid is water which is converted to steam.

5. A process according to claim 4 wherein said fluidized coke is calcined petroleum coke.

6. A process according to claim 1 wherein said fluidized particulate carbonaceous solid is pelleted carbon black, said gas stream is at a substantially higher temperature than said heat exchange fluid, and said heat exchange fluid is water which is converted to steam.

7. A process according to claim 1 wherein the solids separated from said gas in said gas-solids separation zone is passed to wet pelleting and drying.

8. A process according to claim 7 wherein said gas stream contains suspended carbon black and said fluidized bed is coke or pelleted carbon black.

9. A process according to claim 8 wherein said fluidized bed is calcined petroleum coke.

* * * * *